United States Patent [19]

Stuckey

[11] Patent Number: 4,984,698

[45] Date of Patent: Jan. 15, 1991

[54] LOCKABLE CLOSURE CAP

[76] Inventor: William C. Stuckey, 1503 Virginia St., East, Charleston, W. Va. 25311

[21] Appl. No.: 283,093

[22] Filed: Dec. 12, 1988

Related U.S. Application Data

[63] Continuation-in-part of Ser. No. 148,468, Jan. 26, 1988, Pat. No. 4,796,768.

[51] Int. Cl.⁵ ............................................. B65D 55/14
[52] U.S. Cl. .................................... 215/207; 220/210; 70/171
[58] Field of Search ..................... 215/207; 220/210; 70/171, 172

[56] References Cited

U.S. PATENT DOCUMENTS

| | | | |
|---|---|---|---|
| 738,917 | 9/1903 | Kempien | 215/207 |
| 1,694,030 | 12/1928 | Bean | 220/210 |
| 1,702,205 | 2/1929 | Freedman | 220/210 X |
| 1,702,532 | 2/1929 | Boomer et al. | 220/210 |
| 2,820,565 | 1/1958 | Oberle | 70/171 X |
| 3,343,697 | 9/1967 | Roberts et al. | 215/220 |
| 3,426,932 | 2/1969 | Rouse | 215/207 |
| 3,918,602 | 11/1975 | McIntosh | 215/219 |
| 3,950,973 | 4/1976 | Grasnianski | 70/395 |
| 3,998,078 | 12/1976 | Detwiler | 220/210 X |
| 4,107,960 | 8/1978 | Neiman | 220/210 X |
| 4,223,799 | 9/1980 | Eyster et al. | 220/230 |
| 4,299,102 | 11/1981 | Aro | 70/165 |
| 4,690,292 | 9/1987 | Henning | 215/201 |
| 4,775,061 | 10/1988 | Coote | 215/215 |

FOREIGN PATENT DOCUMENTS

1190429 10/1959 France .................................. 70/171

*Primary Examiner*—Stephen Marcus
*Assistant Examiner*—Nova Stucker
*Attorney, Agent, or Firm*—Jim Zegeer

[57] ABSTRACT

A lockable closure cap assembly includes a closure cap having a threaded bore for threadable engagement with the threads of a container neck, an annular shell surrounding said closure cap, and a lock/cam/clutch mechanism for selectively engaging and disengaging the closure cap with the annular shell to permit rotation of the closure cap with the annular shell and free rotation of the annular shell with respect to the closure cap, respectively. The mechanism includes at least one projection on the closure cap, a lock assembly mounted in a fluted bore in said annular shell; the lock assembly has one or more key (or combination) operated lock elements projecting laterally of the axes of said lock. The annular shell has a fluted bore in a surface thereof for receiving said lock assembly with one or more lock elements received in a flute in the fluted bore to prevent rotation thereof in the absence of a key, and permit rotation only on the presence of a key, and a clutch device operated only by the presence of a key in said lock assembly to engage and engage said closure cap with said annular shell. The cam/clutch portion of the mechanism has a clutch shoe carrier for clutch shoes which have cam surfaces interacting with a cam element on the lock cylinder to project and retract the clutch shoes to engage and disengage with a clutch projection on the closure cap.

15 Claims, 3 Drawing Sheets

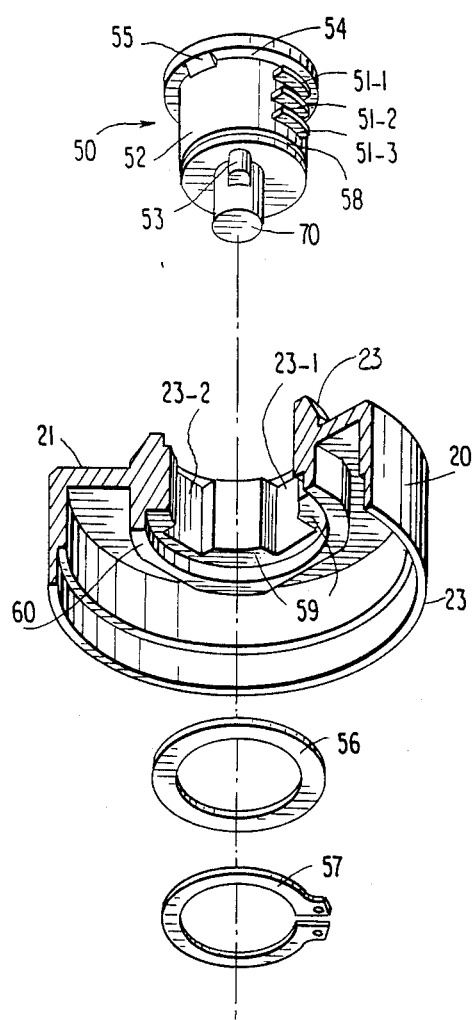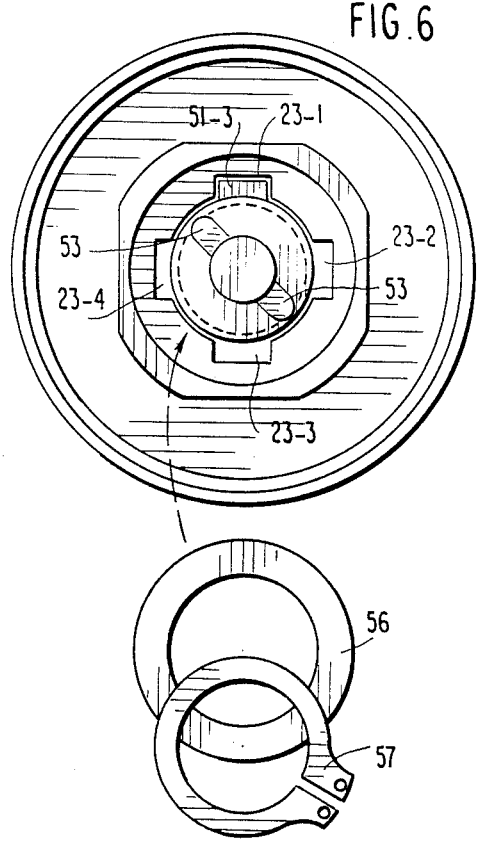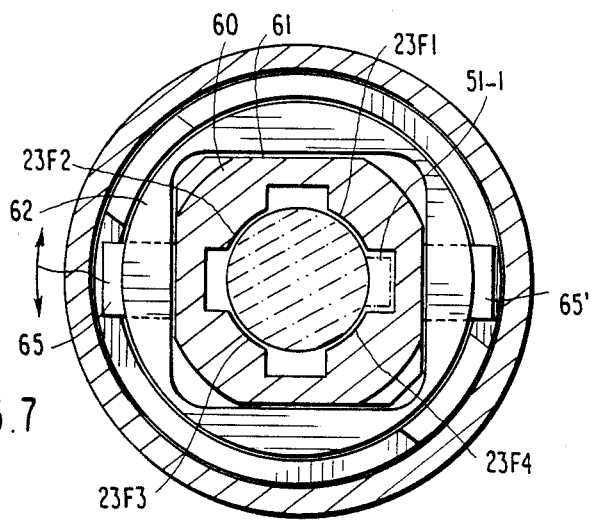

U.S. Patent    Jan. 15, 1991    Sheet 3 of 3    4,984,698
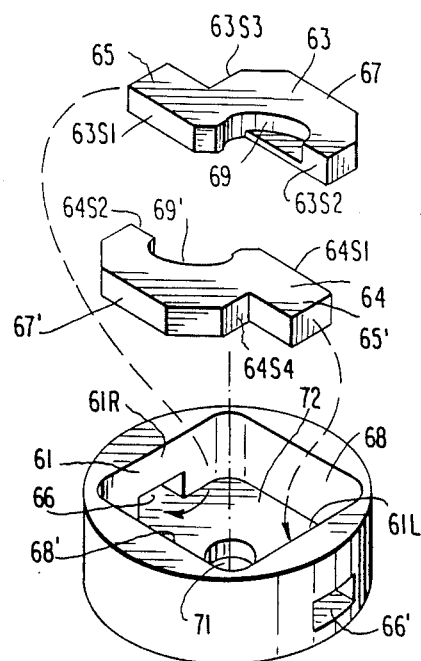
FIG. 8
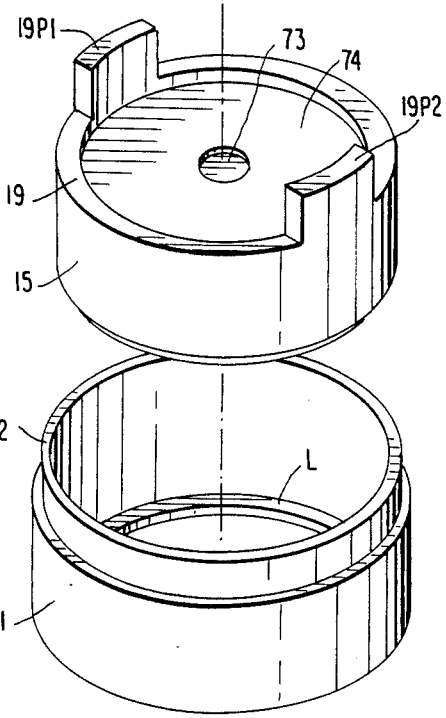
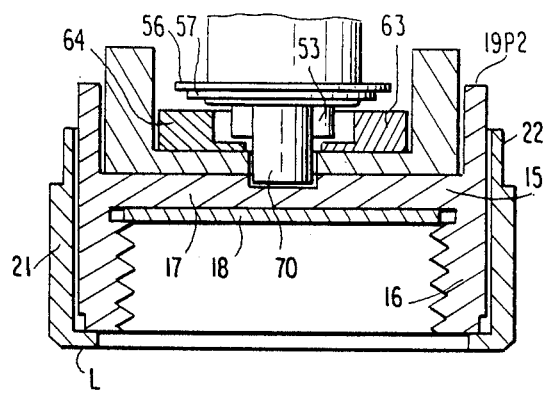
FIG. 9
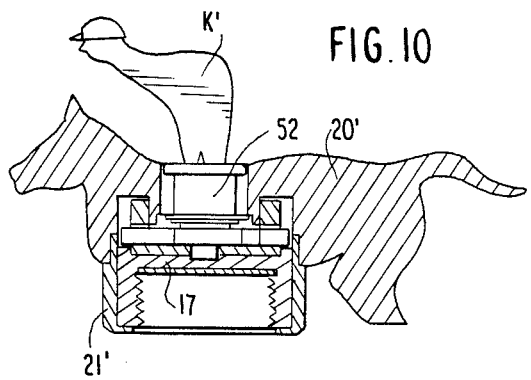
FIG. 10

LOCKABLE CLOSURE CAP

This application is a continuation-in-part of my application Ser. No. 148,468 filed Jan. 26, 1988 entitled "LOCKABLE CLOSURE CAP" now U.S. Pat. No. 4,796,768.

BACKGROUND AND BRIEF DESCRIPTION OF THE INVENTION

Safety closure caps are well known in the art. For many years there have been attempts to develop a lockable closure cap to prevent easy access to the contents of the containers such as whiskey bottles, medicines, drugs and the like. For example, in Kempin U.S. Pat. No. 738,917, a lockable bottle stopper is disclosed in which a threaded stopper is threadably engaged with the threaded neck of a receptacle and a capsule or shell encloses the stopper and a swivel joint is provided between the stopper and the capsule. A key engaging mechanism on the stopper and a key for rotating the stopper causes the threads on the stopper to disengage the threads on the neck of the bottle. By turning the key in one direction, the web on the key element itself engage studs on the closure cap or stopper and screws the stopper onto the neck of the bottle and by reversing rotation of the key the webs also engage the studs to rotate the stopper in the opposite direction and unscrew the stopper off the bottle neck. After the stopper has been attached to the bottle and the key removed, the capsule or shell swivels upon the stopper and when turned will not turn the stopper or closure on the bottle. In Rouse U.S. Pat. No. 3,426,932, a tamper proof poison bottler closure is disclosed in which a screw type main cap has a rib formed across the top thereof. An outer or auxiliary companion cap or shell has a deep depending annular rim encompassing the rim of the main cap with the lid portion thereof being spaced vertically above and parallel to the lid portion of the main cap and is swivelly mounted on a journal so that without a key, the shield freely rotates relative to the inner screw cap. A marginally threaded collar provides a rotary gear like pinion which coacts with a pair of rack elements guided in vertical guideways formed in the inner annular ware of the shield, so that upon rotation of the pinion by a key element, the engaged rack elements slide in their respective guideways into engagement with the rib extending across the top of the screw type main cap to thereby engage the outer shell or shield with the screw cap so that it may be removed. Several rotations of the key are required to cause an engagement of the racks with the rib on the top of the main screw cap.

The lockable closure cap disclosed in my U.S. Pat. No. 4,796,768 provides an inner seal closure cap which is threadably engaged with the threaded neck portion of a conventional bottle or container, and an outer shield or shell member which is mounted for free rotation relative to the seal closure cap. Engagement of the seal cap for twisting motion either on or off is provided by an annular cylindrical clutch element which is integrally formed with the closure cap and projects upwardly therefrom. The annular shell housing carries a lock element which actuates a cam member. A clutch shoe carrier has one or more laterally extending guideways which support one or more clutch shoe elements, which are maintained in an unactuated position by a spring or O-ring type spring. When the lock is actuated (either by a key or by a combination), the cam is rotated approximately 90 degrees and causes the ends of the clutch shoes to operably extend laterally relative to the vertical axis of the bottle or container and the cylindrical clutch element to engage and disengage with the annular surface of the annular cylindrical clutch element upon unlocking and locking, respectively, operation of the lock mechanism.

The object of the present invention is to provide an improved lockable closure cap which has fewer parts, is easier to assemble and lower in cost.

In the present invention, the clutch shoes have inner ends which are shaped to receive an activator which is rotated with the lock mechanism to always positively drive the clutch shoes in the carrier to engagement with an annular clutch element and to a disengaged position. This eliminates the annular spring and the attendant fitment of the clutch carrier and clutch shoes. The clutch element which is formed integral with the closure cap is comprised of one or more upstanding members. The clutch shoes are complementary shaped so as to serve as mutual guides for themselves, in conjunction with the carrier cavity walls. A simpler and less expensive lock mechanism is utilized. A part of the annular shell housing is used as the outer shell for the lock for interacting engagement with the lock pins or plates to thereby provide a less expensive key lock mechanism. The annular outer shell can be molded to accommodate various lock mechanisms. To facilitate and enable automated assembly, a rectangular projection on the inner upper surface of the outer annular shell rests inside a corresponding recess in the clutch carrier and prevents rotation of the clutch carrier relative to the outer annular shell.

Moreover, the annular outer shell can be molded in various artistic designs, heads of people, animals (e.g., a wild turkey or a horse), flowers (e.g., four roses) to promote various brands of liquid contents filling the bottles and letters can be embossed on the external plastic surfaces; and the key itself may have the finger/thumb portion thereof correspondingly artistically shaped or configured (e.g., a jockey for a horse-shaped outer annular shell).

DESCRIPTION OF THE DRAWINGS

The above and other objects, advantages and features of the invention will become more apparent when considered with the following specification and accompanying drawings wherein:

FIGS. 5 and 6 show lock mounting and proper orienting of clutch elements actuating cams and also shows square downwardly extending boss, FIG. 7 illustrates inside the clutch carrier, FIG. 8 is an exploded view of lower half of housing, FIG. 9 is a cross-section illustrating location of cams above ledges provided in actuating clutch fingers, and FIG. 10 is a modification on FIG. 3 illustrating an animal (horse) shape for the outer annular shell and shaping (jockey) of the key thumb/finger grip portion of the key.

DETAILED DESCRIPTION OF THE INVENTION

Figure 1:
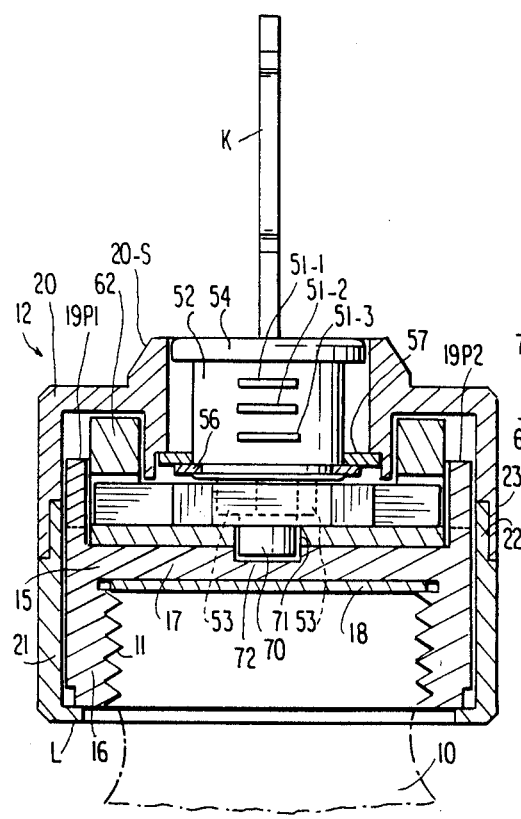
FIG. 1 is a cross-sectional view of a lockable closure cap with key inserted and lock pins retracted.
Figure 3:
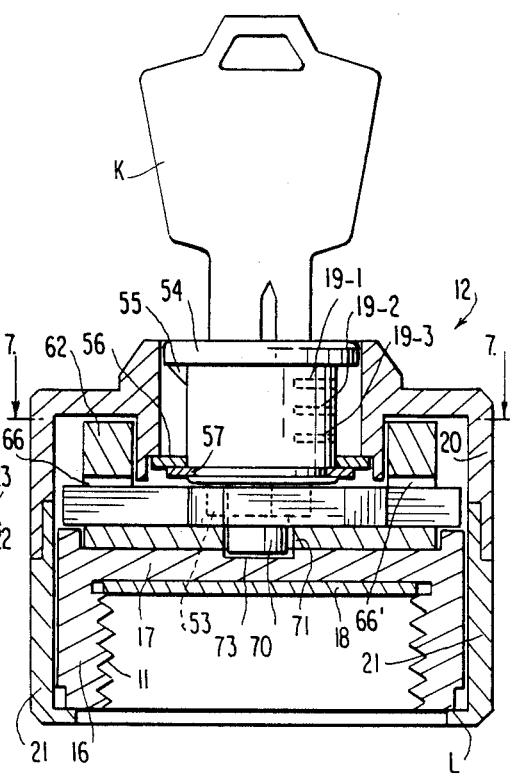
FIG. 3 is a cross-sectional view showing key inserted, lock pins retracted thus allowing rotation of lock barred and lock pins or plates extension.

Referring now to the drawings, a bottle having a neck 10 with external threads 11 is provided with a lockable closure cap 12 which, in this preferred embodiment is a key lockable closure but it will be appreciated that it could be a combination lock as disclosed in my above-referenced U.S. Pat. No. 4,796,768. Molded plastic cap member 15 has an internally threaded annular sleeve 16 and cap member 17 provide the actual normal seal for the bottle or container 10 and may include a sealing disk 18 which may be plastic, cork, foam, etc. Integrally formed with the cap member 15 is an upwardly extending annular cylindrical clutch element 19 which, as shown in the exploded view of FIG. 8 has a pair of upwardly extending prongs 19P1, 19P2. An annular shell housing 20, which is preferably molded of a hard plastic, but may be metal, has an annular skirt 21. Annular skirt member 21 has an upstanding annular portion 22 telescopically received in the depending skirt portion 23 of inner housing 20 and is adhesively or ultrasonically secured thereto so that flange or lip L on the annular rib 21 supports the closure cap 15 within the shell for free rotation therein. That is to say, the cap member 15 and its integrally formed annular clutch element 19P1 and P2 are maintained and operative and freely rotatable rotation and position by lower flange or lip L in shell housing skirt 21. See my U.S. Pat. No. 4,796,768 for other aspects of this feature.

As noted earlier herein, a part of the annular shell housing is used as the outer shell for interacting engagement with the lock pins or plates to thereby provide a less expensive key lock mechanism. As shown best shown in FIG. 5, the upper annular shell housing 20 has an upper wall surface 21 in which is molded an annular lock cylinder 23 which has an series of elongated grooves or channels 23-1, 23-2, 23-3 and 23-4 (see FIG. 6) which are adapted to interact with the plates or pin 51-1, 51-2, 51-3 which are withdrawn upon insertion of the proper key into lock cylinder 50 (FIG. 5). As shown in FIG. 6, the plates 51-1, 51-3 project into slot 23-1 and thus prevent rotation of the lock cylinder 52 and cam member 53 at the lower end thereof. Spring members (not shown) in the lock cylinder 50 normally urge or bias the lock plate members 51-2, 51-2, 51-3 outwardly as shown in FIG. 5 so as to provide a lockingly interengagement with the elongated grooves or channels 23-1 . . . 23-4 in the annular housing portion 20. The lock cylinder 50 has an annular shoulder 54 and cam stop member 55 on the lower surface thereof interengages with flutes 23F1, 23F2, 23F2, 23F4 to limit rotation of the lock cylinder 52 to about 90 degrees upon rotation of the lock cylinder with a key. The cam stop member engages a flute 23F1 . . . 23F4 and cams the lock cylinder upwardly over the upper edge of the engaged flute and against cupped spring 56 and retaining spring clip 57, which is received in annular groove 58 on the lower end of cylinder 52. Spring 56 and split spring retainer 57 bear against the lower surfaces 59 of the flutes 23F to retain the lock cylinder in place. Spring 56 may be eliminated or molded in lower surface 59.

The lower end 60 of the lock cylinder portion 22 of housing 20 has a generally square downwardly extending boss configuration so as to easily fit within a correspondingly square upper opening or chamber 61 in carrier 62 and prevent relative rotation. The sides of the opening 61 serves as guides for one or more clutch shoe elements 63, 64. The clutch shoe elements 63, 64 are complementary and only one need be described.

Clutch shoe element 63 has a clutch engaging projection 65 which slides into and out of slot 66 in carrier 62 and a guide surface 67, which slidingly bears against wall 68 in carrier 62. A curved cam surface 69 is formed on the interior opposite guide surface 67 and is engaged by key cam member 53. A similar construction is provided in clutch shoe element 64 (corresponding numbered elements have been primed). The lower end 70 serves as an axle and passes through aperture 71 in the lower wall 72 of carrier 62 and into well 73 molded in the upper surface 17 of clutch element 15. With respect to clutch shoe elements 63 and 64, each has surfaces 63S1 and 63S2, and 64S1 and 64S2 which slidingly coact in the manner shown in FIGS. 2 and 4. Surfaces 63S4 and 64S4 engage walls 61L and 61R, respectively and act in conjunction with element 55 on the lock cylinder to permit the degree of rotation of the lock cylinder.

Figure 2:
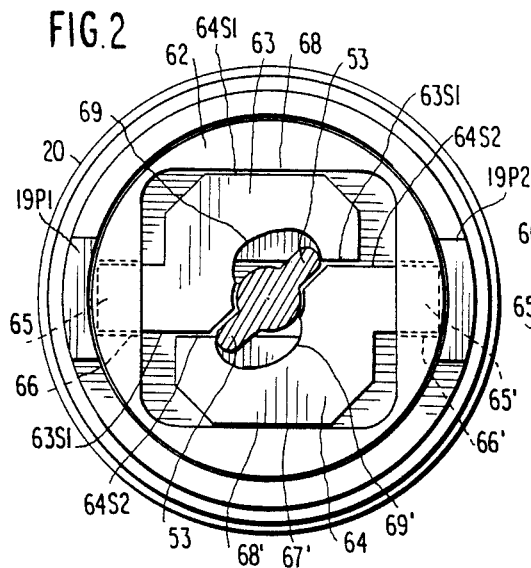
FIG. 2 is a top view of FIG. 1 with upper half of housing removed to show lock pins or plates retracted.
Figure 4:
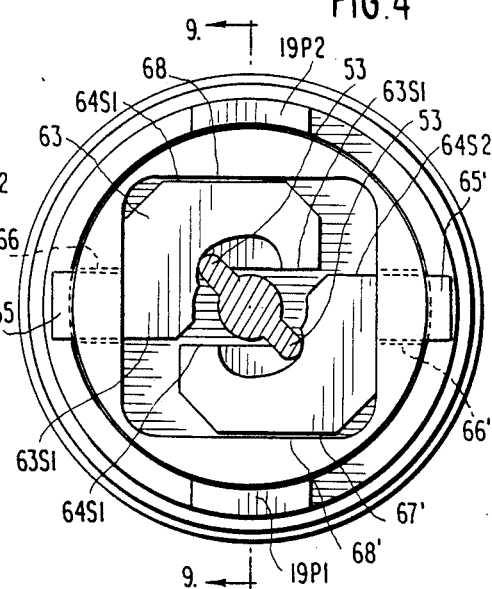
FIG. 4 is a top view of FIG. 3 with upper half clutch fingers extended in position to interfere with clutch posts integral with threaded closure cap.

FIGS. 2 and 4 illustrate the retraction (key removed) of clutch shoe elements 65, 65''. FIG. 2 shows cap 15, 16 closed on bottle 10 and stationary therewith and all other elements being freely rotatable relative thereto, and FIG. 4 shows clutch shoe elements 65, 65' projected to engage with clutch elements 19P1 and 19P2 so that rotation of cap element 15 to enable unscrewing same from bottle 10.

Referring now to FIG. 10, the outer housing 20' may be molded or shaped for aesthetic or artistic designs or advertizing purposes. As an example, in FIG. 10, the outer shell is in the form of a race horse and key R' is in the form of a jockey. Numerous other designs can be easily implemented, some of which have been referred to earlier herein.

While I have shown and described preferred embodiments of the invention, it will be appreciated that numerous modifications and adaptations of the invention will be obvious to those skilled in the art and it is intended to encompass such other modifications as come within the spirit and scope of the claims appended hereto.

What is claimed is:

1. In a lockable closure cap assembly including a closure cap having a threaded bore for threadable engagement with the threads of a container neck, an annular shell surrounding said closure cap, and a mechanism for selectively engaging and disengaging said closure cap with said annular shell to permit rotation of said closure cap with said annular shell and free rotation of said annular shell with respect to said closure cap, respectively, said mechanism including at least one projection on said closure cap, a lock assembly mounted in a bore in said annular shell, said lock assembly having a cam operating member, said closure cap having an upper surface, the improvement comprising a clutch shoe carrier rotatably nested on said upper surface of said closure cap, at least one clutch shoe slidably mounted in said clutch shoe carrier, an arcuate cam surface formed in at least one said clutch shoe and operatively engaged with said cam operating member so that said clutch shoe is moved to and from engagement with said at least one projection on said closure cap solely by rotation of said cam.

2. The lockable closure cap assembly defined in claim 1 said lock assembly includes cylinder and a cam member on the lower end thereof, said clutch device includes a pair of said clutch shoes in said carrier, and cooperating cam means formed on surfaces of said clutch shoes and an end of said cam member, respectively, so that rotation of said cylinder and cam member projects said pair of shoes in opposite directions laterally toward and away from engagement with said at least one projection on said closure cap.

3. In a lockable closure cap assembly including a closure cap having a threaded bore for threadable engagement with the threads of a container neck, an annular shell surrounding said closure cap, and a mechanism for selectively engaging and disengaging said closure cap with said annular shell to permit rotation of said closure cap with said annular shell and free rotation of said annular shell with respect to said closure cap, respectively, at least one projection on said closure cap, the improvement comprising, said annular shell having an upper surface, a fluted bore formed in said upper surface of said annular shell and having at least one channel therein, a lock assembly mounted in said fluted bore, said lock assembly having a rotary axis, one or more key operated lock elements projecting laterally of said rotary axis and receivable in said at least one channel in said fluted bore to prevent rotation thereof in the absence of a key, and permit rotation only on the presence of a key causing retraction of said lock elements from said at least one channel, an axle on the lower end of said lock assembly, a well in the upper surface of said closure cap for receiving said axle, and a clutch device operated only by the presence of a key in said lock assembly and rotation thereof to engage and disengage said closure cap with said annular shell.

4. The lockable closure cap assembly defined in claim 3, said lock assembly includes a cam member on the lower end thereof above said axle, said clutch device includes a clutch shoe carrier nested in said upper surface of said closure cap and inwardly of said at least one projection, one or more clutch shoes in said carrier, and cooperating cam means formed on surfaces of said one or more clutch shoes, and an end of said cam member, respectively, so that rotation of said cylinder and cam member projects said shoes into engaging relation with respect to said at least one projection.

5. The lockable closure cap assembly defined in claim 3 wherein said carrier includes a shaped, non-circular recess in the upper end thereof and coaxial with the rotary axis thereof, and said annular shell including an integrally formed internal member complementarily shaped to and received in said shaped, non-circular recess.

6. In a lockable closure cap assembly including a closure cap having a threaded bore for threadable engagement with the threads of a container neck, an annular shell surrounding said closure cap, and a mechanism for selectively engaging and disengaging said closure cap with said annular shell to permit rotation of said closure cap with said annular shell and free rotation of said annular shell with respect to said closure cap, respectively, said mechanism including at least one projection on said closure cap, a lock assembly mounted in a bore in said annular shell, said lock assembly having a cam operating member, said closure cap having an upper surface, the improvement comprising a clutch shoe carrier rotatably nested on said upper surface of said closure cap, at least one clutch shoe slidably mounted in said clutch shoe carrier, an arcuate cam surface formed in at least one said clutch shoe and operatively engaged with said cam operating member so that said clutch shoe is moved to and from engagement with said at least one projection on said closure cap solely by rotation of said cam and wherein said carrier includes a shaped, non-circular recess in the upper end thereof and coaxial with the rotary axis thereof, and said annular shell including an integrally formed internal member complementarily shaped to and received in said shaped non-circular recess.

7. The lockable closure cap assembly as in any of claims 1–3 or 6 wherein said annular shell is an artistic shape and said lock is a key operated lock having a key with a finger/thumb portion being correspondingly artistically shaped.

8. A lockable closure cap assembly including a molded plastic closure cap having a threaded bore for threadable engagement with the threads of a container neck, a molded plastic annular shell surrounding said molded plastic closure cap, and a mechanism for selectively engaging and disengaging said molded plastic closure cap with said molded plastic annular shell to permit rotation of said molded plastic closure cap with said molded plastic annular shell and free rotation of said molded plastic annular shell with respect to said closure cap, respectively, means forming a bore hole having channels to constitute a fluted bore formed in said molded plastic annular shell, a metal lock assembly mounted in said fluted bore, said metal lock assembly having a rotary axis and one or more key operated metal lock elements projectable laterally of said rotary axis and receivable in a channel in said fluted bore to prevent rotation of said metal lock assembly relative to said fluted bore in the absence of a key, and permit rotation only on the presence of a proper key, said mechanism including a molded plastic clutch device operated only by the presence of a key in said lock assembly and rotation thereof to engage and disengage said molded plastic closure cap with said molded plastic annular shell.

9. The lockable closure cap assembly defined in claim 8, said metal lock assembly includes metal cylinder and a metal cam member on the lower end thereof, said molded plastic clutch device includes a pair of clutch shoes, and cooperating cam means formed on the inner ends of said clutch shoes and an end of said cam member, respectively, so that rotation of said cylinder and cam member projects said pair of shoes laterally toward and away from engagement with said at least one projection on said closure cap.

10. The lockable closure cap assembly defined in claim 8, said metal lock assembly includes a cam member on the lower end thereof, said molded plastic clutch device includes a clutch shoe carrier nested in said upper surface of said closure cap and inwardly of said at least one projection, one or more molded plastic clutch shoes in said carrier, and cooperating surfaces formed on said one or more clutch shoes, and an end of said cam member, respectively, so that rotation of said cylinder and cam member projects said shoe into engaging relation with respect to said at least one projection.

11. The lockable closure cap assembly defined in claim 10, wherein said carrier includes a shaped, non-circular recess in the upper end thereof and coaxial with the rotary axis thereof, and said molded plastic annular shell including an integrally formed internal member complementarily shaped to and received in said shaped, non-circular recess.

12. A lockable closure cap assembly including a molded plastic closure cap having a threaded internal bore for threadable engagement with the external threads of a container neck, a molded plastic annular shell surrounding said molded plastic closure cap and having a top portion and an annular skirt and a mechanism for selectively (1) engaging and (2) disengaging said molded plastic closure cap with said molded plastic annular shell to permit (1) rotation of said molded plastic closure cap with said molded plastic annular shell and (2) free rotation of said molded plastic annular shell with respect to said closure cap, respectively, means forming a bore hole having channels in said top portion of said molded plastic annular shell, a metal lock assembly mounted in said bore hole, said metal lock assembly having a rotary axis parallel to said channels and one or more key operated metal plate elements projectable laterally of said rotary axis and receivable in one of said channels in said borehole to prevent rotation of said metal lock assembly relative to said bore hole in the absence of a key, and permit rotation only on the presence of a proper key in said metal lock assembly, said metal lock cylinder having an axle at the lower end thereof coaxial with said rotary axis and projecting below said cam member, a well formed in the upper surface of said closure for receiving said axle for rotation therein, and a clutch device operated only by the presence of a key in said lock assembly to engage and disengage said molded plastic closure cap with said molded plastic annular shell.

13. The lockable closure cap defined in claim 12 wherein said metal lock includes a lock cylinder, a shoulder at the upper end of said lock cylinder and a stop member on said shoulder, said bore hole having an annular slot for receiving said stop member to limit rotation thereof to the extent of said annular slot.

14. A lockable closure cap assembly including a molded plastic closure cap, a molded plastic annular shell enveloping said molded plastic closure cap, and a clutch mechanism for selectively (1) engaging and (2) disengaging said molded plastic closure cap with said molded plastic annular shell to (1) permit rotation of said molded plastic closure cap with said molded plastic annular shell and (2) free rotation of said molded plastic annular shell with respect to said closure cap, respectively, means forming an axial bore hole having channels in the walls thereof in said molded plastic annular shell, a metal lock assembly mounted in said axial bore, said metal lock assembly having a rotary axis coaxial with said bore hole a plurality of key operated metal plate elements having a shape complementary to the shape of said channels and projectable laterally of said rotary axis and receivable in one of said channels to prevent rotation of said metal lock assembly relative to said vertical bore in the absence of a key, and permit rotation only when a proper key is in said metal lock assembly, a cam stop member on the upper edge of said lock assembly for limiting rotation of said metal lock assembly about said rotary axis and said clutch mechanism being made of molded plastic and operated only by rotation of said proper key in said metal lock assembly to (1) engage and (2) disengage said molded plastic closure cap with said molded plastic annular shell.

15. The invention as defined in claims 8, 12 or 14 including a key, said key having an artistic design embodied therein and wherein said molded plastic annular shell is correspondingly artistically designed.

* * * * *